United States Patent Office 3,544,509
Patented Dec. 1, 1970

3,544,509
DIPHOSPHONIC ACIDS AND SALTS THEREOF
AS FLAME RETARDANTS
Robert L. Carroll, Richmond, Va., and Marvin M. Crutchfield, St. Louis, Mo., assignors to Monsanto Company, St. Louis, Mo., a corporation of Delaware
No Drawing. Continuation-in-part of application Ser. No. 636,599, May 8, 1967. This application Oct. 14, 1968, Ser. No. 767,491
Int. Cl. C08f 45/00; C08g 51/00
U.S. Cl. 260—45.7                        8 Claims

ABSTRACT OF THE DISCLOSURE

Polymers of lower alkylene-1,1-diphosphonates, copolymers of lower alkylene-1,1-diphosphonates and polymerizable ethylenically unsaturated compounds, as well as synthetic polymers containing lower alkylene-1,1-diphosphonates, are described which exhibit many and various advantageous features including increased resistance to burning.

---

The present case is a continuation-in-part of copending application Ser. No. 636,599, filed May 8, 1967, now abandoned.

This invention relates to organic polymeric compositions and, more particularly, provides novel polymeric compositions having increased resistance to burning and a method for rendering polymeric compositions flame retardant.

It is an object of this invention to provide new and useful polymeric compositions.

It is another object of this invention to provide methods for increasing the resistance of organic polymeric compositions to the action of flames and for making them more resistant to burning action in general.

An additional object of this invention is to provide in polymer compositions an organic phosphorus compound having reduced tendency to decompose and/or degrade from the polymer compositions when the polymer system is subjected to elevated temperatures.

Other objects, advantages, and aspects of this invention will become apparent from a reading of the specification and the appended claims.

This invention provides, as new compositions of matter, an organic synthetic polymer (linear or cross-linked) in combination with an organic phosphorus compound as defined herein.

Another aspect of this invention provides, as new compositions of matter, polymers of an organic phosphorus compound as defined herein.

Another aspect of this invention provides, as new compositions of matter, synthetic copolymeric materials prepared using as a comonomer an organic phosphorus compound as defined herein.

A still further aspect of this invention provides a method for reducing the tendency of organic synthetic polymers to burn after a source of burning heat has been removed from the polymeric compositions by incorporating into the organic synthetic polymeric compositions an organic phosphorus compound as defined herein.

The organic phosphorus compounds which can be polymerized or added to, blended with, or co-polymerized with the synthetic polymeric materials to accomplish the above stated objects and aspects are lower alkylene-1,1-diphosphonic acids having the formula (I)    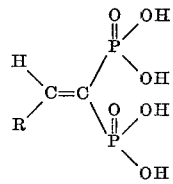

wherein R is selected from the group consisting of hydrogen and methyl and the alkali metal salts thereof (preferably sodium and potassium).

The foregoing compounds can be characterized quite generally as having a

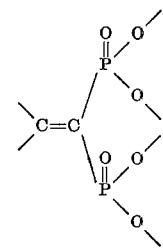

linkage in their molecules and are generically described herein by the term "lower alkylene-1-1,dihposphonates."

Especially preferred ethylene-1,1-diphosphonates are ethylene-1,1-diphosphonic acid (EDP) and an alkali metal salt of ethylene-1,1-diphosphonic acid having the formula:

(II)    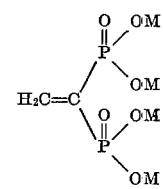

wherein M is selected from the group consisting of hydrogen and alkali metal (particularly sodium and potassium) with at least one M being an alkali metal.

Compounds illustrative of the ethylene-1,1-diphosphonates include: ethylene-1,1-diphosphonic acid and di-, tri- ant tetra-sodium and potassium ethylene-1,1-diphosphonates.

Compounds illustrative of the propylene-1,1-diphosphonates include: propylene-1,1-diphosphonic acid (PDP) and mono-, di-, tri- and tetra-sodium and potassium propylene-1,1-diphosphonates.

In general, the alkali metal salts of a lower alkylene-1,1-diphosphonic acid can be prepared by thermal dehydration of the corresponding salts of 1-hydroxy, lower alkylidene-1,1-diphosphonic acid (1-hydroxy, ethylidene-1,1-diphosphonic acid and 1-hydroxy, propylidene-1,1-diphosphonic acid) at temperatures above about 200° C. and less than about 500° C., with temperatures of from about 250° C. to about 400° C. being preferred. Generally, higher temperatures can be used when the thermal dehydration is carried out, for example, in vacuo or in an inert gas atmosphere such as nitrogen and the like.

Usually, all that is required is to heat the 1-hydroxy, lower alkylidene-1,1-diphosphonate salt for a sufficient time to convert such to a corresponding salt compound of the present invention. In some instances, an inert organic solvent which has a boiling point greater than the temperature used for the dehydration can be used as a solvent. Moreover, a catalyst can be used, if desired, and such tends to lower the temperature at which the thermal dehydration occurs. Suitable catalysts include non-oxidizing alkali metal, alkaline earth metal, and heavy metal salts preferably having an anionic portion which volatilizes at the temperatures used for the thermal dehydration. Such salts include: NaOH, $Na_2CO_3$, KOH, $K_2CO_3$, CaO, $Ca(OH)_2$, $CaCO_3$, MgO, $Mg(OH)_2$, $MgCO_3$, $Fe(OH)_3$, $Fe_2O_3$ and the like. Usually, an amount of catalyst which gives a total molar ratio calculated on a basis of M (metal) to 1-hydroxy, lower alkylidene-1,1-diphosphonic acid of less than about 6:1 is preferred, with a ratio of from about 4:1 to about 5:1 being especially preferred.

From the foregoing dehydration, a lower alkylene-1,1-diphosphonate salt is formed and such can be readily converted to the free acid by dissolving or suspending the salt in water and passing through a strongly acidic cation exchange resin bed or adding an acid, particularly a strong mineral acid ($H_2SO_4$, HCl, $H_3PH_4$ and the like) to precipitate from the solution a salt of the acid, for example, adding $H_2SO_4$ to precipitate $X \cdot SO_4$, and then recovering the lower alkylene-1,1-diphosphonic acid from the aqueous solution by such methods, for example, as allowing the compound to crystallize by cooling a relatively hot aqueous saturated solution, allowing the compound to crystallize from a saturated solution by seeding the solution or by precipitating the compound by addition of a miscible solvent in which the compound is less soluble such as methanol, ethanol, acetone and the like.

In general, lower alkylene-1,1-diphosphonates can be polymerized by carrying out the polymerization by such methods as heating and/or using, as a catalyst, ultra-violet light or a free radical initiator. Usually elevated temperatures are required such as above about 80° C. and temperatures as high as 200° C. or higher can be used depending upon such factors as solvent used, method of polymerizing, use of vacuum or pressures in excess of atmospheric, and the like. Typical examples of free radical initiators are those compounds which are appropriate due to their solubility in the lower alkylene-1,1-diphosphonates and/or the medium used for polymerization, such as water and/or organic solvents and such initiators include the peroxides, such as benzoyl peroxide, tolyl peroxide, di-t-butyl peroxide, hydrogen peroxide and the like. The free radical initiator can be used in various amounts but is generally suitable in a proportion of from about 0.1% to about 15%, preferably from about 1% to about 5% by weight of the lower alkylene-1,1-diphosphonate. The polymerization can be carried out as bulk, precipitation or solution polymerization. Especially preferred for preparing polymers are the monomers ethylene-1,1-diphosphonic acid, its alkali metal salts particularly the partially neutralized salts such as the di- and tri-sodium and potassium salts.

The poly-lower alkylene-1,1-diphosphonates are, in general, very viscous or solid polymers believed to have essentially the following recurring linkage:

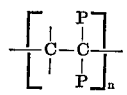

wherein $n$ is a number usually greater than about 4 and may be as high as 1,000 or 100,000 or even higher.

In general, lower alkylene-1,1-diphosphonates can be co-polymerized with polymerizable compounds containing a $CH_2=C<$ group, that is, with polymerizable vinyl and vinylidene compounds containing an ethylene double bond.

The polymerization can be carried out using, in general, the same conditions and methods as described hereinbefore for preparing poly-lower alkylene-1,1-diphosphonate. Especially preferred for use in co-polymerizations is ethylene-1,1-diphosphonic acid. The proportion of lower alkylene-1,1-diphosphonate and ethylenic monomer can vary widely and is preferably from about 20:1 to 1:20 respectively, on a weight ratio basis.

Suitable ethylenically unsaturated monomers include styrene, α-methylstyrene, α-octoxystyrene, vinyl esters of carboxylic acids (vinyl acetate, vinyl propionate, vinyl butyrate, vinyl stearate, vinyl benzoate and the like), vinyl alkyl ketones (methyl vinyl ketone, ethyl vinyl ketone and the like), vinyl alkyl ethers (methyl vinyl ether, butyl vinyl ether and the like), vinyl sulfonamides (vinyl sulfonamide, N-methyl vinyl sulfonamide and the like), vinyl halides (vinyl chloride, vinyl bromide, vinyl fluoride), vinylidene halides (vinylidene dichloride, vinylidene dibromide, vinyldifluoride, vinyl chloride-bromide and the like), vinyl urethanes (vinyl methyl urethane, vinyl ethyl urethane and the like), acrylic acid and its derivatives (acrylamide, N-alkyl acrylamides, acrylonitrile, alkyl esters such as methyl, ethyl, propyl, butyl, benzyl, phenyl acrylates and the like) and methaacrylic acid and its corresponding amides, nitrile, esters and the like. Mixtures of one or more of the foregoing can be co-polymerized with lower alkylene-1,1-diphosphonates.

The co-polymers prepared by polymerizing a lower alkylene-1,1-diphosphonate with an ethylenically unsaturated polymerizable compound are believed to have essentially the following linkage:

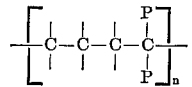

wherein $n$ represents a recurring unit of the polymer usually greater than about 4 and may be as high as 1,000 or 100,000 or even higher.

The presently provided lower alkylene-1,1-diphosphonates are useful as modifiers as well as flame retardants for synthetic polymeric materials. The present lower alkylene-1,1-diphosphonates may be used in a quantity which is equal to that of the polymer, but in most instances favorable results with respect to improvement in flame-retardance are obtained at concentrations which are definitely lower. In some cases amounts as little as 0.1%, by weight of polymer and diphosphonate, may be used, although generally it is preferred that amounts of from about 1% to 50% be used to provide polymeric systems with reduced burning rates. Use of the present lower alkylene-1,1-diphosphonates with the polymeric materials in quantities which confer beneficial properties to the polymers with respect to a desired effect, i.e., flame retardance, often confers to the polymer an improvement also in such characteristics as resistance to impact, dimensional stability, moldability, dye receptivity and the like. Hence in order to arrive at optimum beneficial effect suited to the purposes for which the polymeric composition is designed, only routine testing, involving variation of adjuvant quantity is generally required, although in some instances one or more members of the whole class of the presently provided lower alkylene-1,1-diphosphonates will be found to impart a degree of modification at a low concentration which can be attained by other members of the class at significantly higher concentrations.

The flammability test for measuring the burn qualities of polymer samples is for the most part essentially the standard burn test known as ASTM–D1692–D59T or modifications thereof. As used herein a polymeric composition is considered "no-burning" if there is no evidence of burning (flame or progressive glow) after removal of the burner and a "self-extinguishing" sample is one that continues to burn after removal of the burner but the flame goes out before the second gauge line is reached.

Synthetic polymeric materials, i.e., those high molecular weight organic materials which are not found in nature, with which the present lower alkylene-1,1-diphosphonates are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flame-proofed hereby consists of the polymerized vinyl and vinylidene compounds, i.e., those having the $CH_2=C<$ group. Compounds having such a group are, e.g., the solid polymeric alkenes, such as polyethylene, polypropylene, polyisobutylene or ethylene propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy) ethyl methacrylate, 2-(cyanoethoxy) ethyl 3-(cyanopropoxy) propyl acrylate or methacrylate, 2-(diethylamino) ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluorethylene; polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinyl-succinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinyl furan or vinylthiophene, the vinyl or vinylidene ketones such as methyl vinyl ketone or isopropenyl ethyl ketone; vinylidene cyanide; etc. Copolymers of the above compounds or terpolymers thereof are beneficially modified by the present phosphonates. Examples of such copolymers of terpolymers are those obtained by polymerization of the following monomer mixtures: vinyl chloride-vinyl acetate, acrylonitrile-vinyl-pyridine, styrene-methyl methacrylate; styrene - N - vinyl - pyrrolidone, cyclohexyl methacrylate-vinyl chloroacetate, acrylonitrile - vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylene group, $>C=C<$, are the copolymers and terpolymers of the α, β-olefinic dicarboxylic acids and the derivatives thereof such as the anhydrides, esters, amides, nitriles and imides, e.g., methyl, butyl, 2-ethylhexyl or dodecyl fumarate or maleate, maleic chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present phosphonates are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily and advantageously modified by the present phosphonates are also the polyarylcarbonate polymers such as the linear polyarylcarbonates formed from diphenols or dihydroxy aromatic compounds including single and fused-ring nuclei with two hydroxy groups as well as monohydroxy-substituted aromatic residues joined in pairs by various connecting linkages. Examples of the foregoing include dihydroxy benzenes, naphthalenes and the like, the dihydroxydiphenyl ethers, sulfones, alkanes [bis(4-hydroxyphenyl)2,2-propane], ketones and the like.

Advantageously modified by the present phosphonates are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer of 2-chloro-butadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinyl-benzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by the present phosphonates to give polymeric materials of enhanced utility.

Polymeric materials with which the present lower alkylene-1,1-diphosphonates can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylene phosphonic acid and styrenephosphonic acids and their salts, esters and amides; the silanes such as dimethylvinylsilane, diphenylvinylsilane and methylphenylvinylsilane, etc.

A class of synthetic polymeric materials with which the present phosphonates are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphonates may be incorporated into films of such cellulose derivatives by adding them to the solutions from which the films are cast or into the melts from which the fibers are extruded.

The present phosphonates are particularly suited to the modification of liquid resin compositions of the polyester type, e.g., the linear polyesters which are obtained by the reaction of one or more polyhydric alcohols with one or more α,β-unsaturated polycarboxylic acids alone or in combination, with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrene such as 3,4-dichlorostyrene, α-chloro-styrene, α-methylstyrene; other vinyl-substituted hydrocarbons such as α- or β-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present phosphonates are compatible and are advantageously used. These resins are condensation products formed by the reaction of a polyhydroxy compound and epichlorohydrin, which condensation products are subsequently cured by addition of cross-linking agents. The hydroxy compound may be, e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present phosphonates. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkaline ethers having at least 2 hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di(β-hydroxyethyl) ether, etc. and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3,2-methylpentanediol-2,4,2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600 etc., dipropylene glycol, tripropylene glycol, trithiopropylene glycol, polypropylene glycols 400, 750, 1,200 and 2,000 etc.

Broadly, any of the polyesters, polyisocyanate-modified polyesters, polyesteramides, polyisocyanates-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 2,6-toluylene diisocyanate, 3,3'-dimethyl-4, 4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate triphenylmethane triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,5-naphthalene diisocyanate, etc.

For preparation of the flame-retardant polyurethanes, the present phosphonates are preferably added to a mixture of the reactants and catalyst before hardening. The hardened molded pieces or foams are rendered flame-retardant by the inclusion therein of the phosphonate in quantities of from about 1% to 25% by weight of the polyurethane. Use of the present phosphonates in the polyurethane foams can also, in some applications, improve the mechanical properties of the foams.

Phenolic resins are also beneficially modified by the present phosphonates, which compounds can be incorporated into the resin either by milling in molding applications or by addition to film-forming or impregnating and bonding solutions previous to casting. Phenolic resins with which the present compounds are employed are, for example, the phenolaldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present phosphonates. Examples thereof are the heat-convertible condensation products of an aldehyde with urea, thiourea, guanidine, cyanamide, dicyandiamide, alkyl or aryl guanamides, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity and particular phosphonate used, they serve to modify their physical properties as well as to render them fire-retardant. When the aminoplasts are destined for use as impregnating agents, bonding adhesives, coatings and casting of films, the phosphonates are incorporated into solutions of suspensions in which the aminoplast is carried. The resulting mixtures give strong, fire-retardant laminates when sheets of paper, glass, cloth or fabric are impregnated therewith and cured.

Also beneficially modified by the present phosphonates are the nylons, i.e., the superpolyamides which are generally obtained by the condensation of a diamine, e.g., hexamethylenediamine with a dicarboxylic acid, e.g., adipic acid. Depending upon the quantity and particular phosphonate employed and the individual nature of the compound, there are obtained flame-retardant and/or dye receptor effects.

Other polyamides with which the present phosphonates are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenyl-alanine anhydride; the polymeric lactams, e.g. polycaprolactam, piperidone, 2-oxohexamethyleneimine and other cyclic amides. The present phosphonates can be incorporated into molding or extruding compositions for flame-retardant effect and/or to modify the physical properties of such compositions.

The present phosphonates are also advantageously employed as adjuvants for polymeric aldehydes, e.g., homopolymeric, high-molecular weight formaldehyde.

The present phosphonates are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides whih are formed by the self-condensation of dicarboxylic acids such as sebacic acid or acipic acid, etc. The present phosphonates are flame-retardants for such self-condensation products, generally; and where transparentizing effect and dye receptivity are lacking, the phosphonate compounds are often instrumental in ameliorating such deficiencies.

The following examples are presented to illustrate the invention, with parts and percentages by weight being used in the examples unless otherwise indicated. All polymeric compositions illustrated in the following examples will exhibit reduced burning rates and can be classified as either non-burning or self-extinguishing.

EXAMPLE I

A mixture of 50 parts ethylene-1,1-diphosphonic acid, 150 parts ethyl acetate and 1 part benzoyl peroxide is heated at about 80–95° C. in a flask equipped with a reflux condenser for about 4 hours. A precipitated polyethylene-1,1-diphosphonate is filtered off and washed with acetone.

EXAMPLE II

A mixture of 150 parts of trisodium ethylene-1,1-diphosphonate, 250 parts of water and 1 part potassium persulfate is heated at 90° C. in a flask equipped with a reflux condenser for about 4 hours to obtain polyethylene-1,1-diphosphonate as a viscous liquid. In the same manner, trisodium propylene-1,1-diphosphonate may also be polymerized.

EXAMPLE III

A mixture of 6 parts of ethylene-1,1-diphosphonic acid, 40 parts of styrene monomer and .5 part of benzoyl peroxide is heated at 60° C. in a suitable vessel for about 24 hours to yield a co-polymer resin.

EXAMPLE IV

A mixture of 1 part ammonium persulfate in 120 parts of water are charged into a reaction vessel equipped with a mechanical agitator. The free space in the vessel is flushed with nitrogen and a mixture of 50 parts methyl methacrylate and 10 parts trisodium ethylene-1,1-diphosphonate are added. The vessel is sealed, heated to 50° C. and maintained at this temperature for about 48 hours. A polymer dispersion is removed from the vessel, steamed to remove unreacted monomers, treated with a 10% aluminum sulfate solution and the resulting coagulated polymer is filtered, washed by conventional procedures and dried under vacuum at 50° C.

EXAMPLE V

A salt is prepared from hexamethylene diamine and adipic acid by mixing about 144 parts of amine with about 150 parts of the acid in the presence of 1300 parts of 95% ethyl alcohol and 210 parts of water. The mass is warmed until complete solution occurs and then cooled to obtain crystals of hexamethylene diammonium adipate. To this salt are added about 16 parts of ethylene-1,1-diphosphonic acid and the mixture heated for about three hours with an equal weight of mixed xylenols (B.P. 218–222° C.) and the entire reaction mass is then poured gradually with stirring into a large volume of ethyl alcohol. The modified polyamide precipitates as a granular powder and is filtered, washed with alcohol and dried.

EXAMPLE VI

To samples of a commercial cellulose acetate butyrate having an average acyl content of 13% and 37% butyryl and a viscosity range of 17–33 seconds (64–124 poises) as determined by ASTM method D–1343–54T in the solution described as Formula A, ASTM method D–871–54T are blended on hot mill rolls a sufficient amount of one of the indicated diphosphonates such that the final compositions contain from about 5 to 10% by weight of the added phosphonates. After blending the samples are cooled to room temperature to obtain a polymeric composition. The added diphosphonates are:

(1) EDP
(2) mono-sodium salt of EDP
(3) PDP

EXAMPLE VII

This example illustrates the preparation of a rigid polyurethane foam using one of the indicated diphosphonates therein as the flame-retardant.

| Ingredient: | Parts |
|---|---|
| Methyl glucoside based polyol | 100.0 |
| Trichloromonofluoromethane | 35.0 |
| "Silicone Y-4316" [1] | 2.0 |
| Tetramethylbutane diamine | 1.5 |
| Ethylene-1,1-diphosphonate [2] | 10.0 |
| Polyisocyanate "Mondur MR" [3] | 108.0 |

[1] "Silicone Y-4316"—is a trademark name for a silicon foam stabilizer sold by Union Carbide.
[2] Diphosphonates:
   (1) Tetra-sodium salt of EDP
   (2) EDP
   (3) PDP
[3] Polyisocyanate "Mondur MR"—a polymethylene polyphenylisocyanate having an available NCO content of about 32% and a viscosity at 25° C. of 200±50 cps.

For the above formulation, all of the components except the polyisocyanate are blended to a homogeneous mixture, and then the polyisocyanate is added, the mixture blended thoroughly, and then is allowed to polymerize and rise.

EXAMPLE VIII

To melted samples of a natural high molecular weight low density polyethylene having a density of about 0.9, a melt index of about 0.3 gm./10 min., a softening temperature of about 105° C., and a tensile strength (ultimate) of 2300 p.s.i.g., various amounts of one of the indicated diphosphonates sufficient to make compositions wherein the added diphosphonate comprises from about 4 to 8% of the total weight of the compositions are added. The samples are cooled to room temperature to provide polymer compositions. The added diphosphonate compounds are:

(1) EDP
(2) di-sodium salt of EDP
(3) di-potassium of EDP
(4) tri-sodium salt of PDP

EXAMPLE IX

With about 3 parts of a commercially available condensation product of linoleic acid and a polyamine having an amine value of from 290–320 and a viscosity of 80–120 poises at 40° C., there is mixed 7 parts of diglycidyl ether of Bisphenol A and a sufficient amount of one of the indicated diphosphonates to make a composition having about 16% by weight, based on the weight of the total composition, of the diphosphonates. The resulting reaction mixture is poured into a small aluminum pan (coated with a silicone grease to prevent sticking) and heated in an oven at 100° C. for about 2 hours. After cooling to room temperature an epoxy resinous product is obtained. The added diphosphonates are:

(1) EDP
(2) di-potassium salt of EDP
(3) tetra-sodium salt of PDP

EXAMPLE X

To a polymer blend of an unsaturated polyester prepared by condensing 1½ mol of maleic anhydride, ½ mol of phthalic anhydride and 2.1 mols of propylene glycol to an acid number of about 40 at 200° C., cooling the mixture, adding thereto about 1 mol of a diphosphonate and dissolving the mixture in a sufficient amount of styrene monomer so that the resulting mixture comprises 30 parts styrene monomer to 70 parts of polyester, there is added a small amount (3% w./w.) of benzoyl peroxide and the resulting mixture is polymerized at 80° C. yielding a thermosetting resin. The added diphosphonate compounds are:

(1) EDP
(2) PDP
(3) tetra-sodium salt of EDP
(4) tri-potassium salt of EDP

EXAMPLE XI

To a 10% dichloride solution of polyvinyl acetate there is added one of the indicated diphosphonate compounds in a quantity which is ¼ by weight to that of the polyvinyl acetate present in the solution. Films cast from the resulting mixture are flexible. The added diphosphonate compounds are:

(1) EDP
(2) di-sodium salt of EDP
(3) tri-sodium salt of PDP

EXAMPLE XII

A composition is also obtained by adding one of the indicated diphosphonate compounds in an amount sufficient to be about 10% by weight based on the weight of the total solids content of a 10% benzene solution of a 72:28 molar ratio styrene-acrylonitrile copolymer. The benzene is distilled off yielding a polymeric composition. The added diphosphonate compounds are:

(1) EDP
(2) PDP
(3) tetra-sodium salt of EDP

EXAMPLE XIII

To a 5% solution of a polyvinyl formal in ethylene dichloride there is added one of the indicated diphosphonate compounds in a quantity which is about 20% by weight of the total solids content of the solution. Films are cast from such solutions and then air dried for about 24 hours. The added diphosphonate compounds are:

(1) EDP
(2) tri-potassium salt of PDP
(3) tetra-sodium salt of EDP

EXAMPLE XIV

Improved films are also obtained when one of the indicated diphosphonate compounds is added to a 10% solution of a 50:50 molar ratio styrene-methyl methacrylate copolymer in benzene in an amount sufficient to be about 30% by weight of the total solids content and then cast into films which are flexible. The added diphosphonate compounds are:

(1) EDP
(2) tetra-sodium salt of EDP

EXAMPLE XV

To a granular blend of polystyrene and butadiene-styrene copolymer containing about 6% by weight of the copolymer there is added one of the indicated diphosphonate compounds in an amount of about 4% by weight by blending for 15 minutes in a tumbling type laboratory blender and then extruding the blend into rods. The added diphosphonate compounds are:

(1) EDP
(2) tri-sodium salt of PDP
(3) di-potassium salt of EDP

EXAMPLE XVI

To melted samples of a commercial rigid polymethyl methacrylate polymer there is blended on hot mill rolls one of the indicated diphosphonates in an amount sufficient to provide about 10% of the compound, per total weight of the composition. The samples are milled into sheets in order to obtain polymeric compositions. The added diphosphonates are:

(1) EDP
(2) PDP

EXAMPLE XVII

To 100 parts of a polyvinyl chloride resin there is added 50 parts of dioctyl phthalate and 5 parts of ethylene-1,1-diphosphonic acid. The mixture is placed on hot mill rolls and blended. When thoroughly blended, the product is stripped from the rolls and pressed into square shaped pieces which are soft pliable plastic.

The polymeric compositions of the present invention can find many and various useful applications such as being cast in films, and the like, molded or extruded in many different solid forms, and/or impregnated or deposited on paper, cloth and the like to impart such advantageous features as increased resistance to burning.

What is claimed is:

1. An organic composition comprising an organic synthetic polymer and at least a fire-resistance imparting amount of a compound selected from the group consisting of lower alkylene-1,1-diphosphonic acids having the formula

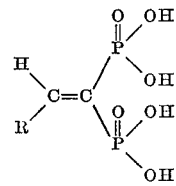

wherein R is selected from the group consisting of hydrogen and methyl and the alkali metal salts thereof.

2. A composition according to claim 1, wherein said compound is ethylene-1,1-diphosphonic acid.

3. A composition according to claim 1, wherein said compound is a sodium salt of ethylene-1,1-diphosphonic acid.

4. A composition according to claim 1, wherein said compound is a potassium salt of ethylene-1,1-diphosphonic acid.

5. A composition according to claim 2, wherein said polymer is a polyester polymer.

6. A composition according to claim 2, wherein said polymer is a polyamide.

7. A composition according to claim 2, wherein said polymer is polystyrene.

8. A composition according to claim 4, wherein said polymer is polyurethane.

References Cited

UNITED STATES PATENTS

| 3,153,013 | 10/1964 | Campbell | 260—77.5 |
| 3,255,276 | 6/1966 | Winter et al. | 260—897 |
| 3,257,337 | 6/1966 | Schoepfle et al. | 260—2.5 |
| 3,400,151 | 9/1968 | Qimby et al. | 260—502.4 |
| 3,402,142 | 9/1968 | Follett | 260—45.75 |

DONALD E. CZAJA, Primary Examiner

R. A. WHITE, Assistant Examiner

U.S. Cl. X.R.

106—15; 252—8.1; 260—2.5, 502.4